United States Patent
Almalowi

(10) Patent No.: US 9,433,898 B2
(45) Date of Patent: Sep. 6, 2016

(54) TOXIC GAS CONDENSATION AND RETREATMENT SYSTEM

(71) Applicant: Saeed J. Almalowi, Bethlehem, PA (US)

(72) Inventor: Saeed J. Almalowi, Bethlehem, PA (US)

(*) Notice: Subject to any disclaimer, the term of this patent is extended or adjusted under 35 U.S.C. 154(b) by 136 days.

(21) Appl. No.: 14/475,108

(22) Filed: Sep. 2, 2014

(65) Prior Publication Data

US 2014/0374064 A1    Dec. 25, 2014

Related U.S. Application Data

(60) Provisional application No. 62/014,237, filed on Jun. 19, 2014.

(51) Int. Cl.
 *B01D 50/00* (2006.01)
 *B01D 53/92* (2006.01)
 *B01D 53/00* (2006.01)

(52) U.S. Cl.
 CPC .............. *B01D 53/92* (2013.01); *B01D 53/002* (2013.01)

(58) Field of Classification Search
 CPC .... B01D 53/96; B01D 53/002; B01D 53/75; B01D 53/92
 USPC .............................. 422/168, 170; 165/104.13
 See application file for complete search history.

(56) References Cited

U.S. PATENT DOCUMENTS

| | | | |
|---|---|---|---|
| 4,008,056 A | 2/1977 | Potter | |
| 4,416,193 A * | 11/1983 | Sharpless | B01D 50/004 118/326 |
| 5,857,324 A | 1/1999 | Scappatura et al. | |
| 6,240,725 B1 | 6/2001 | Scappatura | |
| 6,888,040 B1 * | 5/2005 | Shufflebotham | B01D 53/70 423/240 R |
| 8,601,800 B2 | 12/2013 | Ojima | |
| 2002/0182125 A1* | 12/2002 | Hopkins | B01D 45/06 422/168 |

FOREIGN PATENT DOCUMENTS

| | | |
|---|---|---|
| CA | 2 301 347 C | 11/2006 |
| EP | 2 700 794 A2 | 2/2014 |
| JP | 2013-122225 A | 6/2013 |
| KR | 1335260 B1 | 12/2013 |
| WO | WO 00/09948 | 2/2000 |

* cited by examiner

*Primary Examiner* — Tom P Duong
(74) *Attorney, Agent, or Firm* — Oblon, McClelland, Maier & Neustadt, L.L.P.

(57) ABSTRACT

Apparatuses and systems for reduction and elimination of toxic gases emitted from a motor vehicle or industrial exhaust system. The systems may be single-tier or two-tier, and include at least one direct contact heat exchanger wherein exhaust gas is condensed or dissolved in cold moist air vapor. Uncondensed and undissolved gases may be recirculated into the direct contact heat exchanger to be treated again. The systems also include at least one post-treatment tank wherein condensate liquids and gas solutions are subject to agglomeration and are finally discharged into the environment as a clean liquid. The systems provided herein may complement the existing catalytic converters used in motor vehicles.

18 Claims, 5 Drawing Sheets

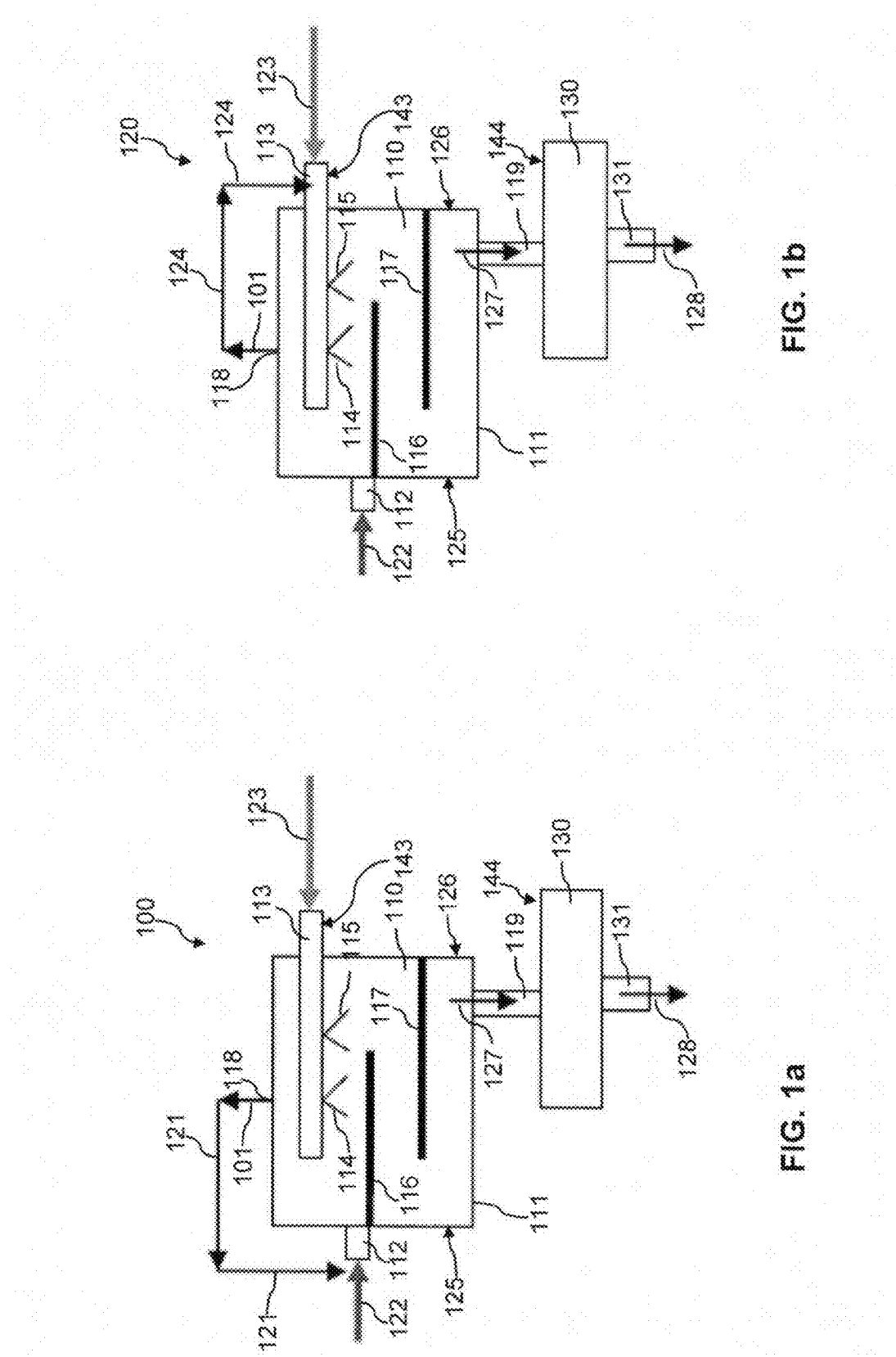

TOXIC GAS CONDENSATION AND RETREATMENT SYSTEM

CROSS REFERENCE TO RELATED APPLICATIONS

This application claims the benefit of U.S. Provisional Application No. 62/014,237 filed Jun. 19, 2014.

GRANT OF NON-EXCLUSIVE RIGHT

This application was prepared with financial support from the Saudia Arabian Cultural Mission, and in consideration therefore the present inventor(s) has granted The Kingdom of Saudi Arabia a non-exclusive right to practice the present invention.

BACKGROUND

1. Field of the Disclosure

The present invention relates to methods, apparatuses and systems for reducing and eliminating toxic gases emitted from exhaust systems.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Exhaust gas or flue gas is emitted as result of the combustion of gaseous, liquid or solid fuels such as natural gas, gasoline or petrol, diesel fuel, fuel oil or coal. Depending on the type of combustor, exhaust gas is discharged into the atmosphere through an exhaust pipe, flue gas stack or propelling nozzle. Examples of the different types of combustion engines include internal combustion, spark-ignition, diesel, gas-turbine, jet, rocket and steam engines.

Exhaust gas is a major component of motor vehicle emissions and also emissions of other stationary industrial combustion engines. These emissions contribute to air pollution and are a major ingredient in the creation of smog in many large cities globally. A 2013 study conducted by Massachusetts Institute of Technology indicated that that 53,000 early deaths occur every year in the United States alone because of motor vehicle emissions. According to another study from the same institution, traffic fumes alone cause the death of 5,000 people every year in the United Kingdom.

The largest part of most exhaust or combustion gas is nitrogen, water vapor and carbon dioxide (except for fuels without carbon). These fluids are not toxic nor noxious, although carbon dioxide is generally recognized as a greenhouse gas that contributes to global warming. Additionally, a relatively small part of combustion gas is undesirable noxious or toxic substances, such as carbon monoxide from incomplete combustion, hydrocarbons from unburnt fuel ($C_xH_y$), nitrogen oxides ($NO_x$) from excessive combustion temperatures, ozone ($O_3$) and particulate matter (mostly soot). The U.S. Environmental Protection Agency estimates the average emission of a passenger car in the country and the results are as shown in Table 1 below.

TABLE 1

Emission rate and annual emission of an average passenger car in the U.S.

| Component | Emission rate (g/km) | Annual emission (kg) |
|---|---|---|
| Hydrocarbons | 1.75 | 35 |
| CO | 13.06 | 261 |
| $NO_x$ | 0.87 | 17.3 |
| $CO_2$ | 258 | 5190 |

To comply with the U.S. Environmental Protection Agency's stricter regulation of exhaust emissions, modern motor vehicles are each equipped with a catalytic converter which is a vehicle emissions control device that converts toxic pollutants in exhaust gas to less toxic pollutants by catalyzing a redox reaction (oxidation or reduction). Apart from motor vehicles, catalytic converters are also used in other internal combustion engines field by either gasoline/petrol or diesel, including lean burn engines. Catalytic converters are also used on electrical generators, forklifts, mining equipment, locomotives, airplanes and woodstoves, usually in response to government regulation, either through direct environmental or health and safety regulations.

A catalytic converter's construction includes three main components: catalyst, washcoat and substrate. The catalyst is a mixture of metals such as platinum, palladium, rhodium, cerium, iron, manganese and nickel. The washcoat is a carrier for the catalytic materials and is used to disperse the materials over a large surface. The substrate is a catalyst support and the core is usually a ceramic monolith with a honeycomb structure.

A two-way or oxidation catalytic converter performs two tasks simultaneously: oxidation of carbon monoxide to carbon dioxide and oxidation of unburnt and partially burnt hydrocarbons to carbon dioxide and water. Due to their inability to control nitrogen oxides, two-way catalytic converters are gradually superseded by three-way catalytic converters. Three-way catalytic converters have the additional ability to reduce nitrogen oxides to nitrogen and oxygen.

Although proven to be reliable and effective in reducing noxious tailpipe emissions, catalytic converters also have some shortcomings and limitations. For example, an engine equipped with a three-way catalytic converter must run at stoichiometric point, therefore increasing the consumption of fuel and adding approximately 10% more carbon dioxide emissions from the engine. Catalytic converters are designed to work within a very limited band of exhaust gas concentration. Gas concentrations that exceed or are below the limits will greatly reduce the efficiency and the life of a catalytic converter and it is very expensive to replace one.

The durability of a catalytic converter is also affected by thermal degradation and poisoning of the catalytic metals by impurities such as lead and sulfur in fuels and zinc, phosphorous and magnesium from lubricating oil additives.

Furthermore, unwanted reactions such as the formation of odoriferous hydrogen sulfide and ammonia can occur in three-way catalytic converters.

There have been many ongoing efforts that aim to overcome the shortcomings and limitations of the catalytic converter. However, the continuing prevalence of catalytic converters in motor vehicles in the market may infer that such efforts have not accomplished the desired success. Examples of these efforts in the prior art include U.S. Pat. No. 6,240,725, U.S. Pat. No. 8,601,800, U.S. Pat. No. 4,008,056, U.S. Pat. No. 5,857,324, JP2013/122225, KR1, 335,260, CA2,301,347 and EP2,700,794 (each incorporated herein by reference in its entirety).

Accordingly, there is a need for new devices and systems that can replace, complement or improve the existing catalytic converters to reduce or eliminate the emission of pollutants from motor vehicle and industrial exhaust systems.

SUMMARY

According to a first aspect, the present invention relates to an exhaust system for eliminating toxic gases from a gaseous exhaust stream comprising an exhaust line in fluid connection with a direct contact heat exchanger comprising a mixing chamber containing a plurality of nozzles spraying cold moist air vapor and at least two horizontal strips positioned at different vertical levels inside the chamber, a recirculation line in fluid connection with the direct contact heat exchanger and a post-treatment tank that is in fluid connection to the direct contact heat exchanger containing a holding reservoir and at least one injection device. The nozzles are configured to spray cold moist air vapor in a sufficient amount to at least partially condense and dissolve the toxic gases. The recirculation line is configured to recirculate remaining toxic gases into the direct contact heat exchanger to condense or dissolve in the cold air and water vapor. The post-treatment tank is configured to agglomerate condensed and dissolved toxic gases.

In one embodiment, the exhaust system further comprises a catalytic converter that treats the remaining toxic gases before the remaining toxic gases are recirculated into the direct contact heat exchanger.

The recirculation line is configured to recirculate remaining toxic gases into the direct contact heat exchanger in a forward stream, a backward stream or both.

According to a second aspect, the present invention relates to an exhaust system for eliminating toxic gases from a gaseous exhaust stream comprising an exhaust line in fluid connection with a first direct contact heat exchanger and a second direct contact heat exchanger downstream of the first direct contact heat exchanger, each direct contact heat exchanger comprising a mixing chamber containing a plurality of nozzles spraying cold air and water vapor and at least two horizontal strips positioned at different vertical levels inside the chamber, a connection line in fluid connection with the first direct contact heat exchanger and the second direct contact heat exchanger, a recirculation line in fluid connection with the second direct contact heat exchanger and a first post-treatment tank that is in fluid connection with at least the second direct contact heat exchanger containing a holding reservoir and at least one injection device. The nozzles are configured to spray cold moist air vapor in a sufficient amount to at least partially condense and dissolve the toxic gases. The connection line is configured to transport remaining toxic gases from the first direct contact heat exchanger to the second direct contact heat exchanger. The recirculation line is configured to recirculate remaining toxic gases into the second direct contact heat exchanger to condense or dissolve in the cold moist air vapor. The first post-treatment tank is configured to agglomerate condensed and dissolved toxic gases.

In one embodiment, the exhaust system further comprises a catalytic converter that is disposed downstream of the first direct contact heat exchanger and upstream of the second direct contact heat exchanger and treats the remaining toxic gases before the remaining toxic gases are injected into the second direct contact heat exchanger.

The recirculation line is configured to recirculate remaining toxic gases into the direct contact heat exchanger in a forward stream, a backward stream or both.

In one embodiment, the system further comprises a second post-treatment tank that may be in fluid connection with the second direct contact heat exchanger and the second post-treatment tank is in fluid connection with the first direct contact heat exchanger.

According to a third aspect, the present invention relates to a gas- and liquid-phase direct contact heat exchanger comprising a housing of a generally cuboidal shape, a mixing chamber, a first inlet on a first side surface, a second inlet on a second side surface directly opposite the first side surface comprising an extended portion inside the mixing chamber, a plurality of nozzles on the extended portion of the second inlet, a plurality of horizontal strips positioned at different vertical levels below the first inlet and the plurality of nozzles, a first outlet, a recirculation line in fluid connection with the first outlet and a second outlet. The first inlet is configured to inject hot gases into the mixing chamber. The second inlet is configured to inject cold moist air. The nozzles are configured to spray cold moist air vapor in a sufficient amount to at least partially condense and dissolve the hot gases. The recirculation line is configured to recirculate remaining hot gases vented by the second outlet into the mixing chamber to condense and dissolve in the cold moist air vapor. The second outlet is configured to release condensed and dissolved gases.

In one embodiment, the heat exchanger is in fluid communication with an exhaust line.

In one embodiment, the horizontal strips are made of metal selected from the group consisting of copper, iron, nickel, aluminum, titanium, chromium, combinations and alloys thereof.

In one embodiment, the vapor has a temperature range of 4-12° C. and a water content of at least 70% w/v.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1a is a schematic diagram of an exemplary toxic gas condensation and retreatment system with a single direct contact heat exchanger and a backward recirculation stream.

FIG. 1b is a schematic diagram of an exemplary single-tier toxic gas condensation and retreatment system with a single direct contact heat exchanger and a forward recirculation stream.

DETAILED DESCRIPTION OF THE EMBODIMENTS

Figure 2A:
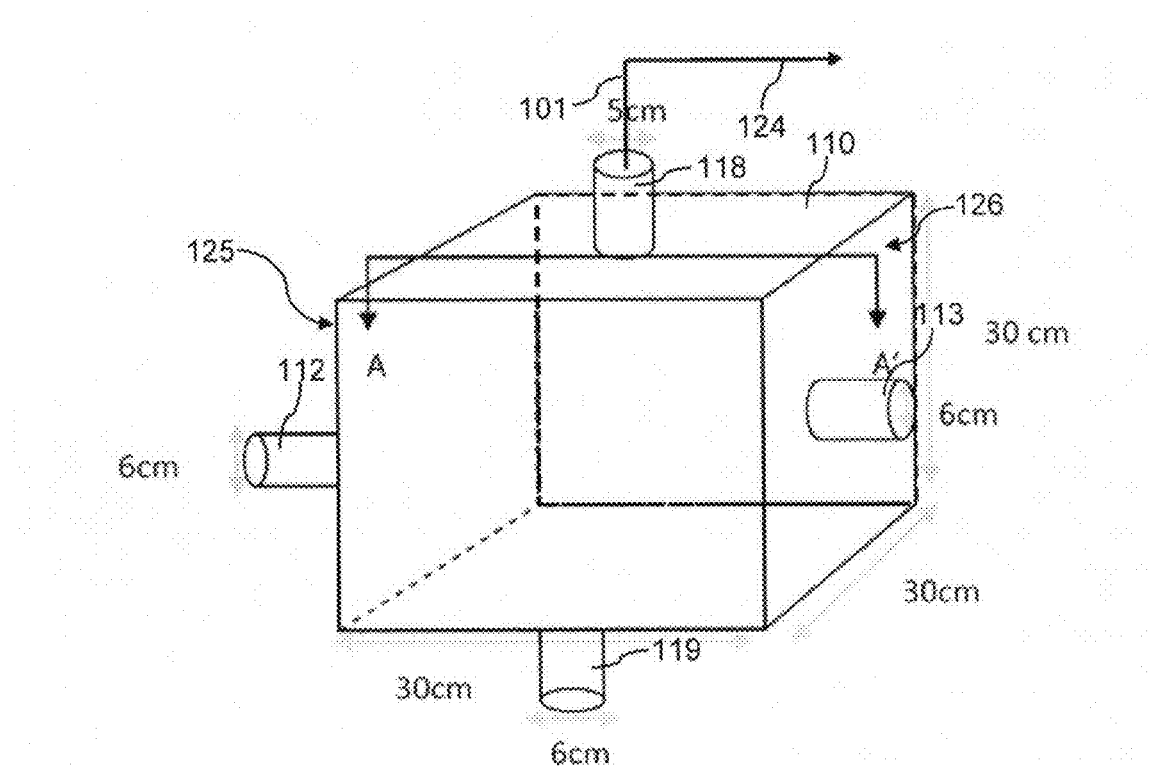
FIG. 2a illustrates the geometry of a direct contact heat exchanger according to one embodiment.

Referring now to the drawings, wherein like reference numerals designate identical or corresponding parts throughout the several views.

A system for the reduction and elimination of toxic gases emitted from a motor vehicle or industrial exhaust system according to one exemplary embodiment of the present invention is indicated in FIGS. 1a and 1b. Single-tier toxic gas condensation and retreatment systems 100 and 120 each includes one direct contact heat exchanger 110 and one post-treatment tank 130. Heat exchanger 110 is gas/liquid phase direct contact heat exchanger that includes housing 110 that may be made of metallic materials such as copper, iron, nickel, aluminum, titanium, chromium, combinations and alloys thereof. Preferably, heat exchanger 110 is of a rectangular or square cuboid shape. For example, in one embodiment shown in FIG. 2a, heat exchanger has a dimension of 30 cm×30 cm×30 cm.

Gaseous exhaust stream (temperature range 93-150° C. or 200-300° F.) as supplied by exhaust line 122 is injected into direct contact heat exchanger 110 through hot gas inlet 112 that is disposed on a first side surface of the heat exchanger 125. Exhaust line 122 is in fluid connection with direct contact heat exchanger 110. The gaseous exhaust stream is composed of a mixture of gases including but not limited to, light hydrocarbons or olefins ($C_xH_y$; x=1, 2, 3), water vapor ($H_2O$), nitrogen ($N_2$), nitrogen oxides ($NO_x$), carbon dioxide ($CO_2$), carbon monoxide (CO), oxygen ($O_2$) and ozone ($O_3$). In one embodiment, hot gas inlet 112 has a generally cylindrical shape with a diameter of 5-10 cm, for example, 6 cm. (see FIG. 2a). Cold moist air of at least 70% w/v moisture content and within a temperature range of 4-12° C. (or 39-54° F.) is supplied by cold air feedline 123 and is injected into direct contact heat exchanger 110 through cold air inlet 113. Referring again to FIG. 2a, in one embodiment, cold air inlet 113 has a generally cylindrical shape with a diameter of 5-10 cm, for example, 6 cm. Preferably, cold air inlet is disposed above the hot gas inlet on a second side surface 126 that is directly opposite the first side surface 125. Hence, heat exchanger acts as a mixing chamber for the gaseous exhaust stream and cold moist air.

Cold air inlet 113 extends further into the body of direct contact heat exchanger 110. In one embodiment, cold inlet 133 may extend for 15 cm (see FIG. 2b). In some embodiments, the extension may range from 5 cm to 18 cm, preferably more than 10 cm. As shown in FIGS. 1a, 1b and 2b, a plurality of nozzles (e.g. 114, 115, 229, 230, 231 and 232) are affixed to bottom surface 143 of the cold air inlet. These nozzles spray the cold moist air vapor that comes in direct contact and mixes with the gaseous exhaust stream entering direct contact heat exchanger 110 through hot gas inlet 112. During the mixing, the exhaust gas either condenses or dissolves in the cold water in the vapor. In one embodiment, mechanical agitation may be introduced to the heat exchanger to aid gas solubility in the cold water.

Still referring to FIGS. 1a, 1b and 2b, in some embodiments, direct contact heat exchanger 110 may further include at least two horizontal strips below the row of nozzles to enhance the mixing of the gaseous exhaust stream and cold moist air vapor. The horizontal strips are made of metallic materials selected from copper, iron, nickel, aluminum, titanium, chromium, combinations and alloys thereof. With a dimension of 30 cm×30 cm×30 cm for direct contact heat exchanger 110, horizontal strips 116 and 117 may each have a length of 15-25 cm and a thickness of 0.5 to 2.5 cm. In one embodiment, the length of strips 116 and 117 is 20 cm and the thickness is 1 cm. The strips are positioned at different vertical levels (wherein strip 116 is above strip 117) and may have a distance of 3-15 cm in between. In one embodiment, the distance between the two strips is 8 cm, with the distance between strip 116 and the top surface of the heat exchanger being 12 cm and the distance between strip 117 and the bottom surface of the heat exchanger being 10 cm.

Now referring to FIGS. 1a and 1b, condensate and gas solution mixture 127, due to lower temperature and greater density, elutes out of direct contact heat exchanger 110 through condensate outlet 119 at the bottom surface of the apparatus. On the contrary, uncondensed and undissolved gas mixture, being less dense and having a higher temperature, will rise and vent through ventilation outlet 118 which is at the top of the apparatus.

A primary feature of the toxic gas reduction and elimination system according to the present invention is the recirculation of the exhaust gas into the system to be retreated. After venting out of direct contact heat exchanger 110, the uncondensed and undissolved gas mixture may be recirculated by recirculation line 101. The recirculation line may be in a backward recirculation stream 121 (FIG. 1a), a forward recirculation stream 124 (FIG. 1b) or both. In FIG. 1a, the backward recirculation stream is injected into heat exchanger 110 through hot gas inlet 112 together with a new batch of gaseous exhaust stream. In FIG. 1b, the forward recirculation stream is injected into the exchanger through cold air inlet 113.

Optionally, in an alternative embodiment, a catalytic converter (not shown in FIGS. 1a and 1b) may be installed in single-tier toxic gas condensation and retreatment systems 100 and 120. Forward recirculation stream 124 and backward recirculation stream 121 may pass through the catalytic converter before they re-enter direct contact heat exchanger 110.

Once eluted out of direct contact heat exchanger 110, condensate and gas solution mixture 127 is transported to post-treatment tank 130 by condensate outlet 119 connecting the tank and the heat exchanger. In an embodiment shown in FIG. 3a, post-treatment tank has a dimension of 20 cm×15 cm×15 cm (length×width×height) and includes a holding reservoir 348 for the condensate and gas solution mixture. In one embodiment, as shown in FIGS. 1a and 1b, condensate outlet 119 is disposed on a top surface of post-treatment tank 144. In another embodiment, seen in FIGS. 3a and 3b, the outlet is disposed on a first side surface of post-treatment tank 345. Condensate outlet 119 has a generally cylindrical shape with a diameter of 5-10 cm, for example, 6 cm.

Figure 3A:
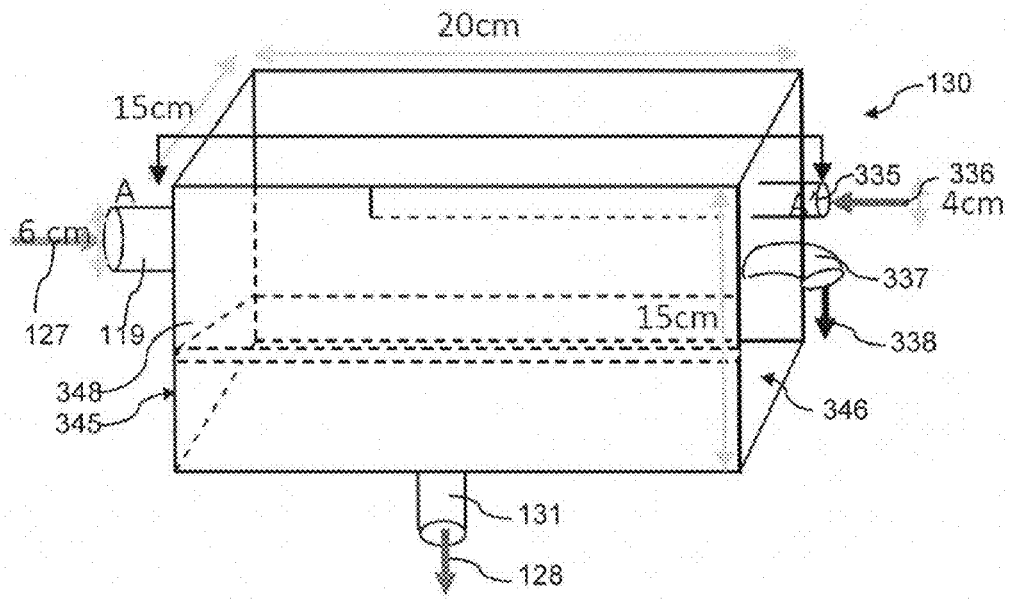
FIG. 3a illustrates the geometry of a post-treatment tank according to one embodiment.
Figure 3B:
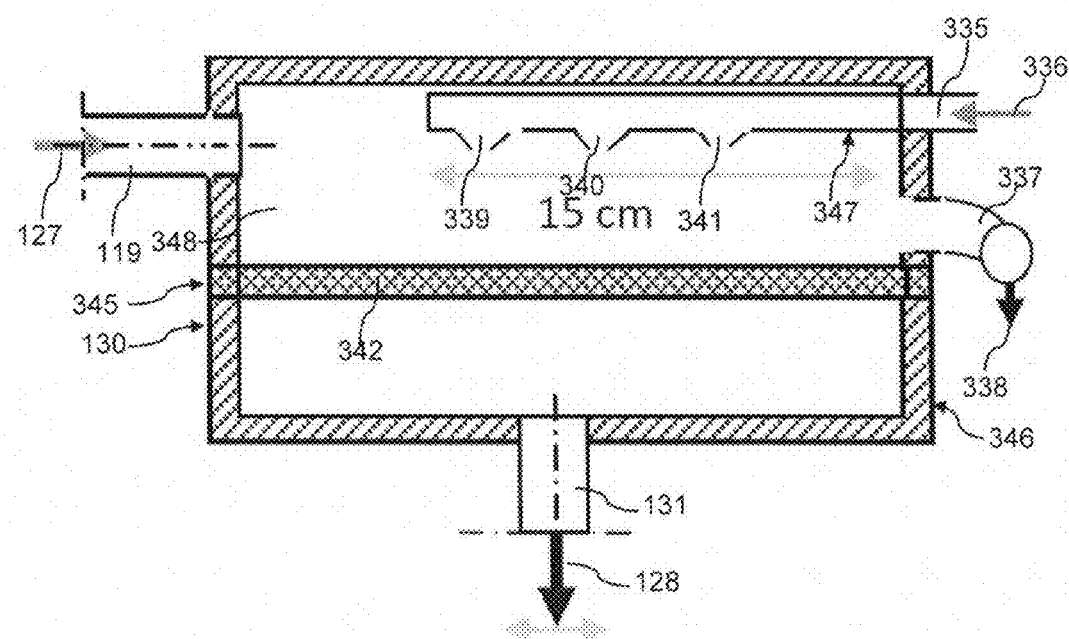
FIG. 3b illustrates a cross-sectional view of the post-treatment tank of FIG. 4a from point A to A'.

Agglomeration by coagulation and flocculation takes place in post-treatment tank 130. These are also essential processes in the treatment of drinking water as well as waste water. Referring to FIGS. 3a and 3b, chemical additives (e.g. coagulants and flocculants) for the agglomeration process 336 may be supplied by chemical additive inlet 335 and injected into the post-treatment tank by injection pumps 339, 340 and 341. The chemical additive inlet 335 may be disposed on a second side surface 346 of the post-treatment tank that is directly opposite the first side surface 345. The chemical additive inlet may have a diameter range of 3-8 cm, for example, 4 cm in one embodiment. In one embodiment, chemical additive inlet 335 extends 15 cm into the body of post-treatment tank 130 and the plurality of injection pumps are affixed to bottom surface of the chemical additive inlet 347. In some embodiments, the extension may range from 5 cm to 18 cm, preferably more than 10 cm. These injection pumps may each include a hole with a 1-cm diameter for injection of the chemical additives. In one embodiment, these injection pumps may be programmed to inject coagulants every 30 seconds for a small exhaust system. In another embodiment, for a large exhaust system, the injection pumps may inject coagulants every second.

Figure 4:
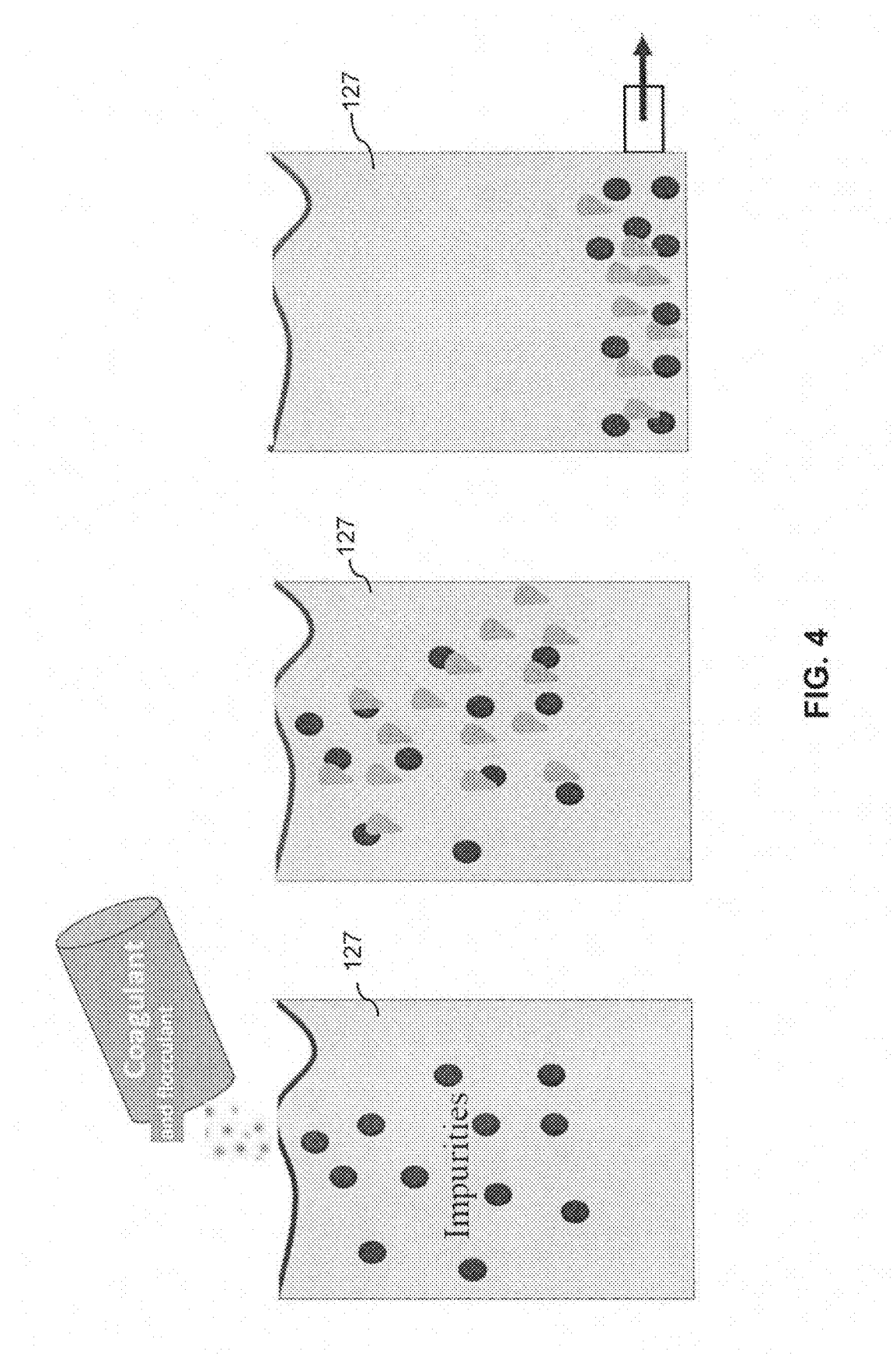
FIG. 4 illustrates the agglomeration process that takes place in the post-treatment tank of the toxic gas condensation and retreatment system.

An exemplary agglomeration process is provided in FIG. 4. Coagulants or clarifying agents that may be used for purposes of the present invention include aluminum-, iron-based coagulants and pre-polymerized inorganic coagulants. When added to condensate and gas solution mixture 127, the coagulant molecules agglomerate with impurities (i.e. dissolved gas molecules and condensate molecules) to form large solid suspended particles or agglomerates. Agglomeration by polymeric flocculants may occur in parallel, resulting in the formation of agglomerates. The agglomerates eventually precipitate and settle on strainer 342 (see FIG. 3b) while filtered, clean liquid 128 is discharged from the post-treatment tank via clean liquid outlet 131 into the environment. Clean liquid outlet 131 has a generally cylindrical shape with a diameter of 5-10 cm, for example, 5 cm. Strainer 342 is made of porous material and the trapped particles may be washed regularly and eluted out of precipitate outlet 337 as eluent 338. In an embodiment shown in FIGS. 3a and 3b, precipitate outlet 337 is disposed on the second side surface 346 below chemical additive inlet 335 and above strainer 342.

Figure 5:
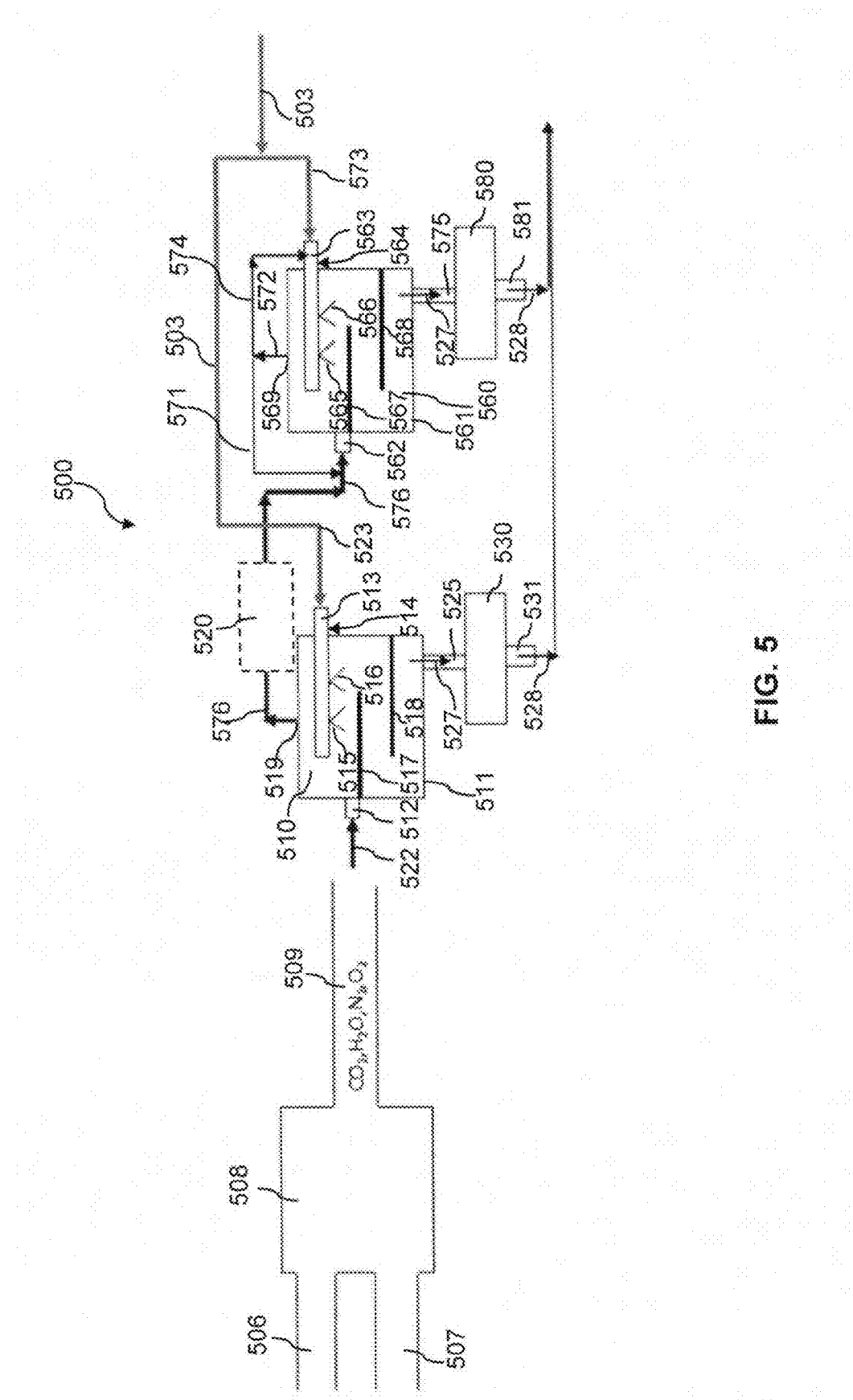
FIG. 5 is a schematic diagram illustrating an exemplary two-tier toxic gas condensation and retreatment system with two direct contact mixing heat exchangers, a post-treatment tank and optionally a catalytic converter.

FIG. 5 illustrates a two-tier toxic gas condensation and retreatment system according to one embodiment of the present invention. Two-tier system 500 generally includes the following main components: first direct contact heat exchanger 510 and first post-treatment tank 530 (tier 1 system), second direct contact heat exchanger 560 and second post-treatment tank 580 (tier 2 system) that is downstream of the tier 1 system and optionally a catalytic converter 520 downstream of first direct contact heat exchanger 510 and upstream of second direct contact heat exchanger 560. Similar to the direct contact heat exchangers described in FIGS. 1a and 1b, first direct contact heat exchanger 510 and second direct contact heat exchanger 560 in FIG. 5 are gas/liquid phase direct contact heat exchangers and each includes a housing (511, 561), a hot gas inlet disposed on a first side surface of the respective heat exchanger 560 in FIG. 5 are gas/liquid phase direct contact heat exchangers and each includes a housing (511, 561), a hot gas inlet disposed on a first side surface of the respective heat exchanger (512, 562), a cold moist air inlet disposed on a second side surface of the respective heat exchanger that is directly opposite of the first side surface (513, 563), a ventilation outlet disposed on the top surface of the respective heat exchanger (519, 569), at least two horizontal strips are positioned at different vertical levels below the hot gas inlet and the cold moist air inlet (517, 518, 567, 568) and a condensate outlet at the bottom surface of the respective apparatus (525, 575). A plurality of nozzles (515, 516, 565, 566) are affixed to bottom surface 513, 563 of the cold moist air inlet. Post-treatment tanks 530 and 580 may be identical in that each includes a clean liquid outlet (531, 581) at the bottom of the tank.

Figure 2B:
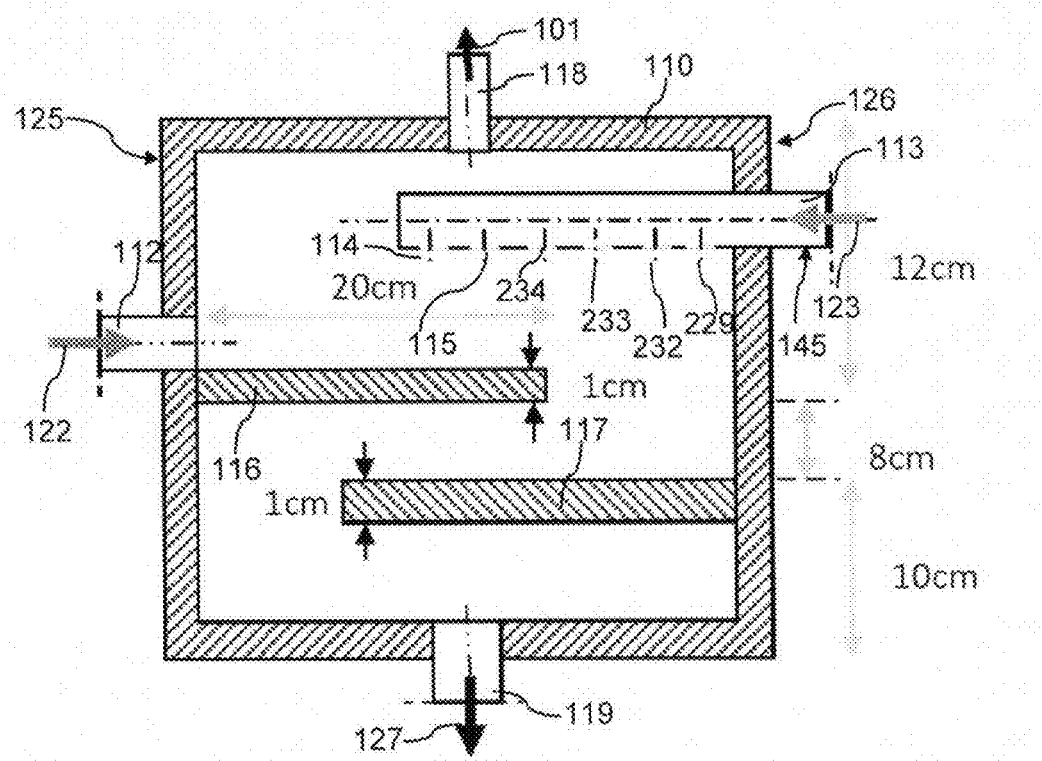
FIG. 2b illustrates a cross-sectional view of the direct contact heat exchanger of FIG. 3a from point A to A'.

In one embodiment, first direct contact heat exchanger 510 and second direct contact heat exchanger 560 may have the dimensions as previously described for the embodiments indicated in FIGS. 2a and 2b.

In one embodiment, post-treatment tanks 530 and 580 may have the dimensions and further include the features as previously described for the embodiments indicated in FIGS. 3a and 3b.

As shown in FIG. 5, when fuel 506 and atmospheric air 507 are mixed in a combustion reaction in combustion engine 508, a gaseous exhaust stream 522 (temperature range 93-150° C. or 200-300° F.) is produced in exhaust pipe 509 and injected into first direct contact heat exchanger 510 through hot gas inlet 512. Gaseous exhaust stream 522 is in fluid connection with first direct contact heat exchanger 510. Main cold moist air feedline 503 divides into first cold moist air feedline 523 and second cold moist air feedline 573. First cold moist air feedline 523 supplies cold air of at least 70% w/v moisture content and within a temperature range of 4-12° C. (or 39-54° F.) is supplied by cold moist air feedline 123 and is injected into heat exchanger 110 through cold moist air inlet 113. Nozzles 515, 516 spray the cold moist air as vapor that comes in direct contact and mixes with the gaseous exhaust stream 522 in the first direct contact heat exchanger. During the mixing, the exhaust gas either condenses or dissolves in the cold water in the vapor. Horizontal strips 517, 518 enhance the mixing of the gaseous exhaust stream and cold moist air vapor.

Condensate and gas solution mixture 527 elutes out of heat exchanger 510 through condensate outlet 525. Meanwhile, uncondensed and undissolved gas mixture rises and vents through ventilation outlet 519 as untreated gas stream. The untreated gas stream is transported to second direct contact heat exchanger 560 by connection line 576. untreated gas stream passes through the catalytic converter wherein some of the remaining toxic pollutants undergo redox reactions to convert into less toxic substances.

After passing through the catalytic converter, the untreated gas stream in connection line 576, in fluid connection with second direct contact heat exchanger 560, is injected into the apparatus through hot gas inlet 562, and undergoes same condensation and dissolution processes. Second direct contact heat exchanger 560 is equipped with the exhaust gas recirculation feature. Hence, when the untreated gas exits the second direct contact heat exchanger through ventilation outlet 569, it is recirculated into the apparatus by recirculation line 572. The recirculation line may be in a forward recirculation stream 574, a back recirculation stream 571 or both. Recirculation of the untreated gas into the direct contact heat exchangers ensures a thorough treatment of the exhaust gas, i.e. all of the exhaust gas gets condensed or dissolved.

Clean liquid 528 is discharged into the environment after the completion of agglomeration processes.

In an alternative embodiment, two-tier toxic gas condensation and retreatment system 500 may include only one post-treatment tank that receives and treats condensate and gas solution mixture from both direct contact heat exchangers.

In one embodiment, mechanical agitation may be introduced to first and second direct contact heat exchangers 510, 560 to aid gas solubility in the cold water.

In one embodiment, all previously described dimensions may be doubled.

In another embodiment, all dimensions may be twenty times of the previously described.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An exhaust system for eliminating toxic gases from a gaseous exhaust stream comprising:
    an exhaust line;
    a direct contact heat exchanger having a mixing chamber containing a plurality of nozzles spraying cold moist air vapor and at least two horizontal strips positioned at different vertical levels inside the chamber;
    a first inlet connected to the direct contact heat exchanger above the horizontal strips and configured to receive the gaseous exhaust stream via the exhaust line and transfer the gaseous exhaust stream to the chamber;
    a second inlet connected to the direct contact heat exchanger on an opposite side of the first inlet and having the plurality of nozzles attached thereto, the second inlet receiving cooled air external to the exhaust system;
    a recirculation line connected with the second inlet and the direct contact heat exchanger at an upper portion of the chamber above the second inlet; and
    a post-treatment tank that is in fluid connection to the direct contact heat exchanger containing a holding reservoir and at least one injection device;
    wherein the nozzles are configured to spray cold moist air vapor in a sufficient amount to at least partially condense and dissolve the toxic gases,
    wherein the recirculation line is configured to recirculate remaining toxic gases from an upper portion of the chamber into the second inlet to condense or dissolve in the cold moist air vapor, and
    wherein the post-treatment tank is configured to agglomerate condensed and dissolved toxic gases.

2. The exhaust system of claim 1, further comprising a catalytic converter.

3. The exhaust system of claim 2, wherein the catalytic converter treats the remaining toxic gases before the remaining toxic gases are recirculated into the direct contact heat exchanger.

4. The system of claim 1, wherein the recirculation line is configured to recirculate remaining toxic gases into the direct contact heat exchanger in a forward stream.

5. The system of claim 1, wherein the recirculation line is configured to recirculate remaining toxic gases into the direct contact heat exchanger in a backward stream.

6. The system of claim 1, wherein the recirculation line is configured to recirculate remaining toxic gases into the direct contact heat exchanger in a forward stream and a backward stream.

7. The exhaust system of claim 1, wherein the second inlet is located above both the horizontal strips and the first inlet.

8. The exhaust system of claim 1, wherein the post-treatment tank performs an agglomeration process by adding a chemical material to the dissolved gases to solidify the gases.

9. An exhaust system for eliminating toxic gases from a gaseous exhaust stream comprising:
    an exhaust line in fluid connection with a first direct contact heat exchanger and a second direct contact heat exchanger downstream of the first direct contact heat exchanger, each direct contact heat exchanger having a mixing chamber containing a plurality of nozzles spraying cold moist air vapor and at least two horizontal strips positioned at different vertical levels inside the chamber; and
    a catalytic converter connected to the first direct contact heat exchanger and the second direct contact heat exchanger;
    wherein the first direct contact heat exchanger includes
        a connection line located at a top of the mixing chamber to transfer toxic gases to the catalytic converter, and
        a first post-treatment tank that is in fluid connection with at least the second direct contact heat exchanger containing a holding reservoir and at least one injection device, and
    wherein the second direct contact heater exchanger includes
        a recirculation line in fluid connection with a second inlet of the second direct contact heater exchanger at a location above the horizontal strips, and
        a first inlet disposed directly opposite and below the second inlet and connected to an output of the catalytic convert,
    wherein the nozzles are configured to spray cold moist air vapor in a sufficient amount to at least partially condense and dissolve the toxic gases;
    wherein the connection line is configured to transport remaining toxic gases from the first direct contact heat exchanger to the second direct contact heat exchanger
    wherein the recirculation line is configured to recirculate remaining toxic gases into the second direct contact heat exchanger to condense or dissolve in the cold moist air vapor; and
    wherein the first post-treatment tank is configured to agglomerate condensed and dissolved toxic gases.

10. The exhaust system of claim 9, wherein the catalytic converter is disposed downstream of the first direct contact heat exchanger and upstream of the second direct contact heat exchanger and treats the remaining toxic gases before the remaining toxic gases are injected into the second direct contact heat exchanger.

11. The system of claim 9, wherein the recirculation line is configured to recirculate remaining toxic gases into the second direct contact heat exchanger in a forward stream.

12. The system of claim 9, wherein the recirculation line is configured to recirculate remaining toxic gases into the second direct contact heat exchanger in a backward stream.

13. The system of claim 9, wherein the recirculation line is configured to recirculate remaining toxic gases into the second direct contact heat exchanger in a forward stream and a backward stream.

14. The system of claim 9, further comprising a second post-treatment tank.

15. The system of claim 14, wherein the first post-treatment tank is in fluid connection with the second direct contact heat exchanger and the second post-treatment tank is in fluid connection with the first direct contact heat exchanger.

16. A gas- and liquid-phase direct contact heat exchanger comprising:
    a housing of a generally cuboidal shape;
    a mixing chamber;

a second inlet on a second side surface directly opposite the first side surface having an extended portion inside the mixing chamber, the second inlet receiving cooled air external to the exhaust system;

a plurality of nozzles on the extended portion of the second inlet;

a plurality of horizontal strips positioned at different vertical levels below the plurality of nozzles;

a first inlet connected above the horizontal strips and configured to receive an gaseous exhaust stream via an exhaust line and transfer the gaseous exhaust stream to the mixing chamber;

a first outlet;

a recirculation line connected with the second inlet at an upper portion of the mixing chamber above the second inlet; and a second outlet;

wherein the first inlet is configured to inject hot gases into the mixing chamber;

wherein the second inlet is configured to inject cold moist air;

wherein the nozzles are configured to spray cold moist air vapor in a sufficient amount to at least partially condense and dissolve the hot gases;

wherein the recirculation line is configured to recirculate remaining hot gases vented by the second outlet into the mixing chamber via the second inlet to condense and dissolve in the cold moist air vapor; and wherein the second outlet is configured to release condensed and dissolved gases.

17. The heat exchanger of claim 16, wherein the heat exchanger is in fluid communication with an exhaust line.

18. The heat exchanger of claim 16, wherein the horizontal strips are made of metal selected from the group consisting of copper, iron, nickel, aluminum, titanium, chromium, combinations and alloys thereof.

* * * * *